United States Patent Office 2,851,429
Patented Sept. 9, 1958

2,851,429
COMBINATION OF AMINOPLAST RESINS AND CERTAIN ALKYD RESINS

John C. Petropoulos, Norwalk, Conn., assignor to American Cyanamid Company, New York, N. Y., a corporation of Maine No Drawing. Application February 7, 1957
Serial No. 638,692

15 Claims. (Cl. 260—21)

This invention relates to novel compositions which contain an aminoplast resin (or resins) in combination with certain novel alkyd resins which comprise the esterification reaction product of a polyhydric alcohol and certain novel dicarboxylic acids, which are to be more fully described hereinafter.

This invention further relates to such novel compositions which are suitable for a wide variety of uses or as, for example, in coating compositions, such as paints, lacquers, in the coating of paper, in laminating compositions, molding compositions, in printing inks, in the treatment of textiles and leather, and in the field of adhesives.

The principal object of the present invention is to provide novel compositions that are adaptable for the general broad spectrum of utility that is indicated hereinabove.

These and other objects and advantages of this invention will become apparent upon reading the detailed description set forth hereinbelow.

According to the present invention, a composition comprising a blend of an aminoplast resin and an alkyd resin is provided in which the said alkyd resin comprises the esterification reaction product of a polyhydric alcohol and an acid having the following general formula:

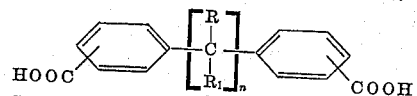

wherein R and $R_1$ are alkyl groups containing from 1 to 4 carbon atoms and $n$ is a whole number between 1 and 2, inclusive.

As is generally known, alkyd resins may be classified as oil-free or as oil-containing alkyds, the latter group being further classified as short, medium, and long-oil resins.

When the alkyd is classified as oil-free, the two essential components are (1) a polycarboxylic acid, usually free from non-benzenoid unsaturation or its anhydride and (2) a polyhydric alcohol. If the alkyd resin is an oil-containing alkyd, a third component, a glyceride oil, which may be either non-drying, semi-drying, drying, or the fatty acids derived therefrom, or their monoglycerides, are present.

The carboxylic acid employed in making alkyd resins is present in preponderate amounts, with respect to the total polycarboxylic acid content, sometimes to the complete exclusion of any unsaturated polycarboxylic acids, such as those that are not free from any non-benzenoid unsaturation. The α,β-ethylenically unsaturated polycarboxylic acids, such as maleic, fumaric, aconitic and the like, may be used in relatively small amounts, generally in amounts not exceeding about 10% by weight of the total weight of polycarboxylic acids.

The novel dicarboxylic acids of the present invention may be employed alone in the preparation of the alkyds of the present composition or in combination with one or more other polycarboxylic acids free of non-benzenoid unsaturation. Examples of suitable acids which may be employed with the dicarboxylic acids of this invention are phthalic, oxalic, malonic, succinic, glutaric, sebacic, adipic, pimelic, suberic, azelaic, tricarballylic, citric, tartaric, malic, and the like. When available, the anhydrides of these acids may be used. Furthermore, mixtures of these acids and/or their anhydrides may be employed with the dicarboxylic acids of this invention.

Among the polyhydric alcohols which may be used are ethylene glycol, diethylene glycol, trimethylene glycol, tetramethylene glycol, pinacol, arabitol, xylitol, adonitol, mannitol, glycerol, trimethylol propane, trimethylol ethane, sorbitol, hexanetriols as, for example, hexanetriol-1, 2,6, pentaerythritol, dipentaerythritol, the alkane diols, such as butanediol-1,4, propylene glycol, dipropylene glycol, and the line. These polyhydric alcohols may be used alone or in admixture with each other.

Oils suitable for use in formulating oil-containing alkyds include coconut oil, cottonseed, soybean, linseed, perilla, castor, babassu, murumuru, tallow beef, mustard seed, rape seed, peanut, walnut, sesame, sunflower, safflower, tung, oiticica, whale, menhaden, sardine, and the like. These oils may be used alone or in admixture with each other.

The novel acids employed in the making of the alkyd resin, that is, an essential component of the present composition, may be prepared according to the methods set forth in my earlier filed application, Serial No. 523,355, filed July 20, 1955, entitled "Novel Products And Process For Preparing The Same" of which application this application is a continuation-in-part.

The acids employed in the alkyd resin component of this invention are prepared by oxidizing ditolyl alkanes having the general formula:

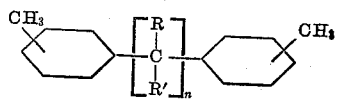

wherein R and R' are alkyl groups containing from 1 to 4 carbon atoms and $n$ is a whole number between 1 and 2, inclusive.

These ditolyl alkanes may be prepared by reacting toluene with an aldehyde such as acetaldehyde to form a 1,1-ditolyl alkane such as 1,1-ditolyl ethane, and then reacting said ditolyl ethane with an alkyl halide or with an olefin to produce the desired ditolyl alkane. More details regarding said process steps are set forth hereinbelow, and in my earlier application, referred to hereinabove.

The ditolyl alkanes may be prepared by reacting compounds having the following general formula:

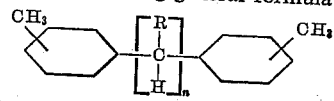

wherein R is hydrogen or an alkyl group containing between 1 and 4 carbon atoms, and wherein $n$ is a whole number between 1 and 2, inclusive, with an olefin having between 2 and 4 carbon atoms, such as ethylene, propylene and butylene, including alpha, beta or isobutylene.

Instead of using an olefin containing between 2 and 4 carbon atoms, compounds of the general formula immediately above could be reacted with alkyl halides having between 1 and 4 carbon atoms, such as methyl iodide or the like, to yield a methyl substituent in place of the hydrogen on the alkane. The total number of moles of methyl halide or olefin used in the reaction will depend on the total number of available hydrogens on the alkanes that are to be replaced.

The following examples are set forth primarily for the purpose of illustrating a method for the preparation of suitable ditolyl alkanes. All parts are by weight.

PREPARATION OF 2,2-DI(P-TOLYL)BUTANE

Into an autoclave there is introduced 105 parts of 1,1-di(p-tolyl)ethane, 5 parts of sodium and 1.5 parts of o-toluic acid. The system is purged with nitrogen gas and then sealed. The autoclave is then heated to about 170° C. and the pressure is released. There is then charged 11.8 parts of ethylene to 900 p. s. i. and the system is closed. The temperature is then maintained at 170° C. with intermittent addition of ethylene until no further pressure drop is experienced. This requires about 6 hours. The autoclave is then cooled and the reaction products are filtered and washed with hexane. The filtrates are combined, washed and distilled. The product produced is 2,2-di(p-tolyl)butane having a boiling point of 196° C. at 20 millimeters of pressure.

PREPARATION OF 3,3-DI(P-TOLYL)PENTANE

The preceding example is repeated in all essential details, except that in the place of 1,1-di(p-tolyl)ethane, there is substituted an equivalent amount of 1,1-di(p-tolyl)propane, and in the place of o-toluic acid, there is substituted an equivalent amount of o-chloro-toluene. The resultant product is a viscous liquid having a boiling point of 213–220° C. at 15 mm. of mercury. The product is 3,3-di(p-tolyl)pentane.

Among the ditolyl alkanes which may be prepared by a comparable process or by the alkyl halide process and which may be used to produce the acids used in the practice of the process of the present invention are 2,2-di(p-tolyl)propane; 2,2-di(o-tolyl)propane; 2,2-di(m-tolyl)propane; 1,2-di(p-tolyl)-1,1,2,2-tetramethylethane; 1,2-di(p-tolyl)-1,1,2,2-tetraethylethane; 1,2-di(p-tolyl)-1,1,2,2-tetrapropylethane; 1,2-di(p-tolyl)-1,1,2,2-tetrabutylethane; 1,2-diethyl-1,2-dimethyl-1,2-di(p-tolyl)ethane; 1,1,2,2-tetraethyl-1,2-di(o-tolyl)ethane; 1,1,2,2-tethraethyl-1-(o-tolyl)-1-(p-tolyl)ethane; 2,2-di(p-tolyl)butane; 2,2-di(o-tolyl)butane; 2,2-di(m-tolyl)butane; 2,2-di(p-tolyl)pentane; 2-(o-tolyl)-2-(p-tolyl)pentane; 2,2-di(m-tolyl)pentane; 3,3-di(p-tolyl)pentane; 3,3-di(o-tolyl)pentane; 3,3-di(m-tolyl)pentane; 2,2-di(p-tolyl)hexane; 3-(o-tolyl)-3-(m-tolyl)hexane; 3,3-di(p-tolyl)heptane; 3,3-di(o-tolyl)heptane; 4,4-di(p-tolyl)heptane; 4,4-di(p-tolyl)octane; 5,5-di(p-tolyl)nonane; 5-(o-tolyl)-5-(p-tolyl)nonane; 5,5-di(m-tolyl) nonane, and the like. These and other suitable ditolyl alkanes are oxidized to the dibenzoic acids used in the preparation of alkyds used in my present composition. These alkanes may be oxidized under any of the usual oxidizing conditions to form the corresponding dicarboxylic acid. The oxidation may be carried on employing temperatures from room temperature up to about the boiling point of the ditolyl alkane and may be carried out in the presence of any of the well-known oxidizing reagents, such as chromic acid in glacial acetic acid, potassium permanganate in the presence of an alkali, potassium dichromate in the presence of a strong acid such as sulfuric acid, or the oxidation may simply be carried out by flowing air, oxygen or an oxygen-containing gas through the charge. Further, heavy metal catalysts such as the metallic salts of organic acids, such as the cobalt, lead, iron, nickel, manganese, magnesium, and the like salts of acetic acid, propionic acid, oleic, stearic, rosin acids, naphthenic acid, and the like.

The oxidation may be carried out either at atmospheric pressure or super-atmospheric pressure, such as about 3 or 4 atmospheres. The oxidation may be carried out either in the liquid or in the vapor phase. In the vapor phase, the ditolyl alkane would be vaporized and, in being boiled off, would be passed over a fixed bed of catalyst of the vanadium type. In the vapor phase, there is a possibility of closer control of the contact time, temperature, and the separation of the oxidized material from the unoxidized in a recycling operation. In such an oxidation reaction, it is generally desirable to stop the conversion at about 30 to 40% of the calculated yield in order to avoid side reactions and other complications. The oxidation reaction being stopped at just such a point permits the separation of the dicarboxylic acids thus produced and the recyclization of the ditolyl alkanes.

The lower limit on the reaction temperature of the oxidation reaction is generally considered to be above the melting point of the particular ditolyl alkane selected for oxidation. Still lower temperatures can be utilized if the oxidation is carried out with the ditolyl alkane dispersed or dissolved in a solvent medium. However, the utilization of the solvent medium may well affect the upper limit at which the oxidation can be carried out, inasmuch as the boiling point of the solvent will be one of the controlling factors in the oxidation temperatures. Of course, if super-atmospheric pressure is utilized, the boiling point of the solvent is not a necessary limitation on the temperature of the oxidation reaction. The solvent medium should properly be a material which cannot readily be oxidized under the oxidation conditions of the reaction. Otherwise, complications of mixed end products will be presented. In addition to the oxidations in a solvent medium, dispersions and emulsions may be utilized as the medium for oxidation.

In order that the process for oxidation may be more fully appreciated, the following examples are given primarily by way of illustration. All parts and percentages are by weight unless otherwise indicated.

A

PROCESS FOR PREPARING 4,4'-(2,2-BUTYLIDENE) DIBENZOIC ACID

Into a suitable reaction vessel equipped with thermometer, stirrer and reflux condenser, there is introduced 10 parts of 2,2-di(p-tolyl)butane, 300 parts of acetic acid, 300 parts of water, 90 parts of concentrated sulfuric acid and 70 parts of chromic acid. The mixture is heated to reflux temperature and maintained at that temperature for about 10 hours. On diluting the reaction mixture with water, 7 parts of a solid material precipitated. After purification by recrystallization from alcohol, this solid material melted at 267° C. uncorrected, and had a neutral equivalent of 150 (theoretical=149). The product produced is identified as 4,4'-(2,2-butylidene)dibenzoic acid.

B

PROCESS FOR PREPARING 4,4'-(2,2-BUTYLIDENE) DIBENZOIC ACID

Into a suitable autoclave, there is introduced 23.8 parts of 2,2-di(p-tolyl)butane, 30.6 parts of concentrated nitric acid, and 61.0 parts of water. The reactants are heated to 160° C., whereupon the reaction becomes exothermic and the temperature increases to about 190° C. The reactants are held at 170–190° C. for 30 minutes. Thereafter, the charge is cooled to room temperature and the reactants are discharged. The product produced, a light tan solid, is obtained in an 84% yield and melts at about 220–225° C. After several recrystallizations from acetic acid to remove the color impurities, the melting point is raised to 267–8° C. uncorrected. The analysis: Calculated for $C_{18}H_{18}O_4$: C, 72.47; H, 6.08; neutral equivalent 149. Found: C, 72.23; H, 6.14; neutral equivalent 150.

C

PROCESS FOR PREPARING 4,4'-(3,3-PENTYLIDENE)DIBENZOIC ACID

In to a suitable autoclave, there is introduced 25.2 parts of 3,3-di(p-tolyl)pentane, 30.6 parts of concentrated nitric acid and 61 parts of water. The reactants are heated to 160° C., whereupon the reaction becomes exothermic and the temperature rises to about 185–190° C. The reactants are held at 175–190° C. for about 30 minutes, whereupon the charge is cooled to room temperature and the reactants discharged. The yield is approximately 87% of theoretical and the product produced is a light tan solid which melts at about 255–285° C. After several recrystallizations from acetic acid, the melting point is determined at 305–6° C., uncorrected. The product produced is 4,4'-(3,3-pentylidene)dibenzoic acid. Analysis: calculated for $C_{19}H_{20}O_4$: C, 73.06; H, 6.45; neutral equivalent 156. Found. C, 73.11; H, 6.65; neutral equivalent 153.

D

PROCESS FOR PREPARING 4,4'-(1,1,2,2-TETRAMETHYLETHYLENE)DIBENZOIC ACID

Into a suitable reaction vessel equipped as in Example A, there is introduced 20 parts of 1,1,2,2-tetramethyl-1-2-di(p-tolyl)ethane, 600 parts of acetic acid, 600 parts of water, 140 parts of chromic acid and 180 parts of sulfuric acid. The charged mixture is heated at the reflux temperature for about 22 hours. Dilution of the system with water caused 20 parts of a solid material to precipitate, which had a neutral equivalent of 113. The crude solid which precipitated was treated with alkali yielding two fractions; the first fraction (A) was soluble in cold alkali, whereas the second fraction (B) was soluble in hot alkali. The latter fraction (B) on acidification, gave a solid acid which, after purification by crystallization from acetic acid, melted at 218–219° C. uncorrected. The analysis and infrared spectrum on this material are compatible with the monobasic acid having the following formula: 1,1,2,2-tetramethyl-1-(p-tolyl)2-(p-carboxyphenyl)-ethane. Analysis calculated for $C_{20}H_{24}O_2$; C, 81.04; H, 8.16; —COOH, 15.19. Found: C, 81.30; H, 8.23; —COOH, 14.88. The acidification of Fraction A produced a while solid material having a melting point greater than 300° C. The material was found to be 4,4'-(1,1,2,2-tetramethylethylene)dibenzoic acid.

E

PROCESS FOR PREPARING 4,4'-(1,1,2,2-TETRAETHYLETHYLENE)DIBENZOIC ACID

Example A is repeated in substantially all details, except that the ditolyl alkane used as a starting material is 1,1,2,2-tetraethyl-1,2-di(p-tolyl)ethane and the dicarboxylic acid produced is 4,4'-(1,1,2,2-tetraethylethylene)dibenzoic acid.

F

PROCESS FOR PREPARING 4,4'-(1,2-DIETHYL-1,2-DIMETHYLETHYLENE)DIBENZOIC ACID

Example A is repeated in substantially all essential details, except that the ditolyl alkane which is oxidized is 1,2-diethyl-1,2-dimethyl-1,2-di(p-tolyl)ethane. The acid produced is 4,4'-(1,2-diethyl-1,2-dimethylethylene)dibenzoic acid.

G

PROCESS FOR PREPARING 4,4'-ISOPROPYLIDENEDIBENZOIC ACID

Example A is repeated in all essential details, except that the ditolyl alkane which is oxidized is 2,2-di(p-tolyl)propane and the corresponding acid is produced, namely, 4,4'-isopropylidenedibenzoic acid.

In order to illustrate the preparation of the alkyd resins employed in the compositions of the present invention, the following examples are given. These examples are provided primarily for the purpose of illustrating a method of preparation of alkyd resins using the novel dicarboxylic acids of the present invention. These examples are given primarily by way of illustration and no details therein should be construed as limitations on the present invention, except as they appear in the appended claims. All parts and percentages are by weight unless otherwise indicated.

ALKYD RESIN A

Into a suitable reaction vessel, equipped with thermometer, stirrer, and inlet and outlet tubes for passage for inert gases therethrough, there is introduced 298 parts of 4,4'-(2,2-butylidene) dibenzoic acid, 240 parts of soya fatty acids and 118 parts of glycerin. The charge is heated to about 245° C. and held at that temperature until esterification is substantially complete. This medium oil resin has an acid number of 10.9 and a Gardner-Holdt viscosity of Z–2 at 50% solids in xylol at 25° C. and a color of 5 (Gardner-1933).

ALKYD RESIN B

Into a suitable reaction vessel equipped as in A above, these is introduced 284 parts of 4,4'-isopropylidenedibenzoic acid, 240 parts of linseed oil fatty acids, 100 parts of glycerin and 18 parts of ethylene glycol. The reaction chamber is flushed with nitrogen gas so as to provide an inert gas blanket over the reacting materials during the reaction. The charge is then heated to about 240–250° C. and held at about that temperature until esterification is substantially complete as indicated by an acid number of 15.

ALKYD RESIN C

Into a suitable reaction vessel equipped as in A above, there is introduced 312 parts of 4,4'-(3,3-pentylidene)dibenzoic acid, 360 parts of the fatty acid fraction of talloil, 119 parts of pentaerythritol, and 95 parts of propylene glycol. The reaction vessel is flushed with nitrogen as in B above, and the charge is then heated to about 250° C. and held at that temperature until esterification is substantially complete as is shown by an acid number of 8.

ALKYD RESIN D

Into a suitable reaction vessel equipped as in A above, there is introduced 708 parts of dimethyl 4,4'-(1,1,2,2-tetramethylethylene)dibenzoate, 294 parts of the methyl esters of dehydrated castor oil fatty acids, 187 parts of pentaerythritol and 4.5 parts of lead octoate. The charge is heated under a blanket of nitrogen gas to 190–200° C. whereupon methanol is continuously removed. The reaction is stopped short of gelation. The resin is diluted with Cellosolve acetate to a solids content of about 50%.

ALKYD RESIN E

Into a suitable reaction vessel equipped as in A above, there is introduced 298 parts of 4,4'-(2,2-butylidene)dibenzoic acid, 175 parts of lauric acid, and 130 parts of 98% glycerol. The reaction mixture is heated to 220 to 230° until esterification is essentially complete. The resulting short-oil alkyd had an acid number of 5.8, a Gardner-Holdt viscosity between X and Y at 60% solids in xylol and a Gardner-Holdt color of 3 to 4.

ALKYD RESIN F

Into a suitable reaction vessel equipped as in A above, there is introduced 298 parts of 4,4'-(2,2-butylidene)dibenzoic acid, 168 parts of lauric acid, and 112 parts of glycerin. The reaction mixture is heated to between 220 and 230° C. until esterification is essentially complete. The resulting short-oil alkyd was characterized by an acid number of 9.8, a Gardner-Holdt viscosity of Z+1 at 60% solids, in xylol, and a Gardner-Holdt color of between 3 and 4, as read on a 60% xylol solution.

ALKYD RESIN G

Into a suitable reaction vessel equipped as in A above, there is introduced 284 parts of 4,4'-isopropylidenedibenzoic acid, 168 parts of lauric acid, and 112 parts of 98% glycerol. The resulting reaction mixture was heated to a temperature of between 220 and 230° C. until esterification was essentially complete. The resulting short-oil alkyd was characterized by an acid number of 8, a Gardner-Holdt viscosity between Z–1 and Z–2 in a 60% xylol solution, and a Gardner-Holdt color of from 3 to 4, as measured on a 60% xylol solution.

ALKYD RESIN H

Into a suitable reaction vessel equipped as in A above, there is introduced 312 parts of 4,4'-(3,3-pentylidene)dibenzoic acid, 168 parts of lauric acid, and 112 parts of 98% glycerol. The resulting reaction mixture is heated to a temperature of between 200 and 235° C. until esterification is essentially complete. The resulting short-oil alkyd is characterized by an acid number of 10, a Gardner-Holdt viscosity of from between Z to 2 and Z to 3, when measured on a 60% xylol solution, and a Gardner-Holdt color of from 3 to 4, as measured on a 60% xylol solution.

ALKYD RESIN I

Into a suitable reaction vessel equipped as in A above, there is introduced 298 parts of 4,4'-(3,3-pentylidene)dibenzoic acid, 134 parts of hexanetriol-1,2,6, and 117 parts of hexanediol-1,6. The resulting reaction mixture is heated to a temperature of between 200 and 235° C. until esterification is essentially complete. The resulting oil-free alkyd is characterized by an acid number of 12.

In the preparation of the alkyd resins employed in the composition of this invention, one may react any of the novel dibenzoic acids, the preparation of which is illustrated above, with any of the conventional polyhydric alcohols, illustrative examples of which are given above, used in the preparation of alkyd resins. In addition, if the alkyd is to be oil modified, any of the glyceride oils known for this purpose, a representative number of examples of which are given above, may be co-reacted with the polyols listed hereinabove to first form the alcoholysis product and the latter is co-reacted with the dibenzoic acids utilized in this invention, in accordance with the general procedure outlined in Examples A–I above.

Alkyd resins employed in the composition of the present invention should have an acid number of less than about 100 and preferably less than 50. Optimum results are obtained in most cases employing alkyds having an acid number between about 5 and 25.

The alkyds employed in the composition of the present invention may be made by what is termed a "straight fusion" process, as illustrated in Examples A through I, or alternatively adding an inert solvent, such as the proper amount of xylene, or mineral spirits, and removing the water of esterification azeotropically, as is known in the art.

The aminoplast component of the present composition may be selected from a wide variety of known aminoplast materials. Among the aminoplast materials, the triazine-aldehyde reaction products are greatly preferred, such as shown in U. S. Patent No. 2,197,357. Any triazine containing one or more amino or imino or amido groups, containing one or more reactive hydrogens, may be reacted with any aldehyde or mixture of aldehydes to prepare condensation products falling within the scope of this invention. For example, melamine, formoguanamine, mono-amino-1,3,5-triazine, ammeline, ammelide, melam, melem, halogenated compounds, such as mono-chloro-diamino-1,3,5-triazine, obtainable from cyanuric chloride, hydrocarbon substituted triazines, such as phenyl-diamino-1,3,5-triazine, monomethyl-diamino-1,3,5-triazine, triazines containing substituted amino groups, such as 2,4,6-triethyl-triamino-1,3,5-triazine, or 2,4,6-triphenyl-triamino triazine, and the like, may be used. Any one or more of these, either singly or in admixture with compounds of the class described hereinabove and hereinafter, may be reacted with any one or more aldehydes, such as formaldehyde, acetaldehyde, benzaldehyde, crotonaldehyde, furfural, and the like, in aqueous or organic solvents.

Suitable mole ratios between a triazine and an aldehyde are determined by the number of aldehyde reactive hydrogens on the triazine and the degree of reaction desired. Thus, 1 mole of aldehyde for each such reactive hydrogen is normally employed, though a smaller amount of aldehyde may be employed in special cases. Larger amounts, for example, 2 or 3 and more moles of aldehyde per reactive hydrogen, have been successfully employed. Thus, if it was desired to fully methylolate melamine, a minimum of 6 moles of formaldehyde per mole of melamine would be required.

These triazine-aldehyde reaction products may be further reacted with saturated aliphatic alcohols containing from between 1 and 4 carbon atoms to provide suitable useful alkylated derivatives. The alkylated derivatives are preferred over the unalkylated type compounds, in that they are generally more compatible in conventional solvent mediums with the alkyd resins of the present invention. In this connection, up to 6 moles of the suitable alcohol may be combined, as in the case of hexamethoxy-hexamethylol melamine.

Another large and suitable class of triazines useful in the composition of the present invention are diamino triazines and substituted derivatives thereof. These diamino triazines, generally referred to as guanamines and substituted guanamines, and derivatives thereof, include, by way of example, benzoguanamine, formoguanamine, acetoguanamine, various aliphatic substituted guanamines, such as those disclosed in U. S. Patent 2,394,526, cyano-aceto guanamine, 2-(4-ethyl-4-ethyl-2-cyano)octanoguanamine, β-ethoxy propionoguanamine, β-amyl oxy propionoguanamine, β-oxy dipropionoguanamine, β-carboxy-amyl oxy propionoguanamine, lactoguanamine, levulino-guanamine, β-carboxy methoxy propionoguanamine, various alkoxy alkyl guanamines, and alkoxy alkoxy alkyl guanamines, such as, for example, those disclosed in U. S. Patent No. 2,491,658 and, more specifically, 4,6-diamino-2-(ethoxy methoxy)methyl-1,3,5-triazine; 4,6-diamino-2-(isobutoxy methoxy)methyl-1,3,5-triazine; 4,6-diamino-2-tertiary butoxy methyl-1,3,5-triazine; 6-(propoxy methoxy ethyl)-2,4-diamino-S-triazine; 6-(isopropoxy methoxy ethyl)-2,4-diamino-S-triazine; 6-(butoxy methoxy ethyl)-2,4-diamino-S-triazine; 6-(propoxy methoxy methyl)-2,4-diamino triazine; 6-(1,1'-dimethyl-2,4-dioxaheptyl)-2,4-diamino-S-triazine; 6,6-(tertiary butoxymethyl)-2,4-diamino-S-triazine; 6-(tertiary butoxy ethyl)-2,4-diamino-S-triazine; and many others.

In addition to the triazines, urea-aldehyde reaction products and their alkylated derivatives may be employed in the present invention. As examples of the same urea per se, thiourea, various cyclic ureas, such as ethylene urea, propylene urea, 1,2-propylene urea, and the like, may be used. The formaldehyde reaction products of these compounds and their alkylated derivatives as, for example, dimethylated dimethylol urea, may be employed, singly or in combination with one another or with one or more of the various triazines of the type illustrated hereinabove.

Regardless of which amino material is used, and which aldehyde is condensed therewith, it is generally preferred that the reaction product be subsequently reacted with an alcohol in the case of melamine-aldehydes, and preferably butanol, for purposes of compatibility with the various alkyl resins and their solvent mediums. As indicated above, various aldehydes may be used in these condensations, but for the most part, formaldehyde as formalin or paraformaldehyde is greatly preferred, from the point of view of economics and ease of handling.

In order that the present invention may be more fully understood, the following examples are given primarily by way of illustration. No details found therein should be construed as limitations, except as they appear in the appended claims. All parts and percentages are by weight unless otherwise specifically designated.

*Example 1*

Two coating compositions are prepared using an alkyd resin prepared as in A above and a commercially available phthalic anhydride alkyd resin in admixture with an aminoplast resin in a ratio of 75 parts of alkyd resin to 25 parts of a butylated melamine-formaldehyde resin (B–M–F). The pigment-to-resin ratio is 0.9:1. The alkyd resins are substantially identical in each instance, except in regard to the dicarboxylic acid used. Films from these coating compositions are drawn down on steel panels and baked for 30 minutes at 300° F. The results of the tests to which these films were subjected are shown in Table I.

TABLE I

|  | B-M-F+ Alkyd Resin of A | B-M-F+ Phthalic Alkyd Resin |
|---|---|---|
| Knife scratch | Excellent | Fair. |
| Solvent Resistance Xylol | Good | Do. |
| 5% NaOH | Excellent | Poor. |
| 50% Acetic Acid | do | Do. |

The preceding set of two enamels are repeated in every detail except that the pigment-to-resin ratio is 0.56:1. The results are shown in Table II.

TABLE II

|  | B-M-F+ Alkyd Resin of A | B-M-F+ Phthalic Alkyd Resin |
|---|---|---|
| Knife scratch | Excellent | Fair. |
| Solvent Resistance Xylol | do | Good. |
| 5% NaOH | do | Fair. |
| 50% Acetic Acid | do | Do. |
| Flexibility | do | Good. |

Example 2

Into a suitable reaction vessel equipped as in A above, there is introduced 312 parts of 4,4'-(3,3-pentylidene)-dibenzoic acid, 255 parts of refined soya fatty acids and 115 parts of 98% glycerine. The ingredients are heated up to and held at about 260° C. under an inert nitrogen atmosphere with agitation until the esterification is substantially complete. The alkyl product had an acid number of 7.8, a viscosity of X at 50% solids in xylol on the Gardner-Holdt scale at 25° C. and a color of 5 (Gardner–1933).

This alkyd was mixed with a butylated melamine resin, as was a commercially available phthalic alkyd resin, and the resulting compositions were drawn down on steel plates where the film is dried and cured for 30 minutes at 300° F. Comparative property tests results are indicated in Table III below.

TABLE III

|  | B-M-F+ Alkyd Resin of Example 2 | B-M-F+ Phthalic Alkyd Resin |
|---|---|---|
| Knife scratch | Excellent | Fair. |
| Solvent Resistance Xylol | Good | Poor. |
| 5% NaOH | Excellent | Do. |
| 50% Acetic Acid | do | Do. |

Example 3

The alkyd resin prepared in Examples E through I hereinabove were compatible and were blended with various aminoplast resins in various proportions, as indicated in Table IV hereinbelow. In all cases, films of the above mixture were cast on glass and baked for 30 minutes at 300° F. In all cases, except where Alkyd F was employed, p-toluene sulfonic acid was used as catalyst in amounts between 0.5 and 2%, based on the weight of the catalyst, to enhance cure. These films, when compared with comparable aminoplast modified alkyd resins as, for example, those employing phthalic anhydride as the dicarboxylic acid component in the alkyd resin, were generally superior and the resulting films were hard, clear, glossy, and had an excellent resistance to heat, water, and alkali.

TABLE IV

| Aminoplast Modifier | Alkyd E | | | | Alkyd F | | | | Alkyd G | | | | Alkyd H | | | | Alkyd I | | | |
|---|---|---|---|---|---|---|---|---|---|---|---|---|---|---|---|---|---|---|---|---|
| Benzoguanamine-formaldehyde resin | 70 | 70 | 30 | 30 | 60 | 75 | 85 | 70 | 70 | 70 | 30 | 30 | 70 | 70 | 30 | 30 | 70 | 70 | 30 | 30 |
|  | 30 | ---- | 70 | ---- |  |  |  |  | 30 | ---- | 70 | ---- | 30 | ---- | 70 | ---- | 30 | ---- | 70 | ---- |
| α-(tertiary butoxy) propioguanamine-formaldehyde resin |  | 30 |  | 70 |  |  |  |  |  |  |  |  |  |  |  |  |  |  |  |  |
| Butylated urea-formaldehyde resin |  |  |  |  | 40 |  |  |  |  | 30 |  | 70 |  | 30 |  | 70 |  | 30 |  | 70 |
| Butylated benzoguanamine-formaldehyde resin |  |  |  |  |  | 25 |  |  |  |  |  |  |  |  |  |  |  |  |  |  |
| Hexamethoxymethylol melamine |  |  |  |  |  |  | 15 |  |  |  |  |  |  |  |  |  |  |  |  |  |
| Butylated melamine formaldehyde resin |  |  |  |  |  |  |  | 30 |  |  |  |  |  |  |  |  |  |  |  |  |

All parts of the above compositions are based on total resin solids content.

Generally speaking, for surface coatings, the aminoplast modified alkyd resins of the present invention may contain from between about 5 and about 50% and, in some cases, more, of the suitable aminoplast, based on the weight of resin solids, while preferably this range is between about 10 and about 30% of aminoplast resin, based on the total weight of resin solids.

Normally, alkyd used with aminoplast resins range in oil content from between 0% to about 60%, and sometimes more, and in most cases, particularly where the combination is employed for surface coatings, in amounts of from between 20 and 50%.

While it is generally preferred that when the composition of the present invention is employed for purposes of surface coatings, that a compatible blend of aminoplast resin and alkyd resin be employed, this is not essential, in that these two essential components of the instant compositions may be rendered compatible by varying the composition of the alkyd resin and/or the aminoplast resin, to provide a compatible composition.

It should be understood that the term "compatible," as it is used herein, refers to the ability of the alkyd and aminoplast to form a single phase, as opposed to a two or more phase solution. Preferably, the single phase is substantially free from haze and other undesirable physical characteristics.

As generally indicated hereinabove, the aminoplast modified alkyd resin compositions of the present invention may be generally employed in the field of lamination. The following examples are primarily for the purpose of illustrating this feature. No details therein should be construed as limitations on the present invention, except as they appear in the appended claims.

Example 4

Alpha-cellulose overlay paper, pretreated with a diallyl phthalate resin and an anionic surface active agent identified as Triton X–100 was treated with a 50–50 ethyl Cellosolve ethanol solution containing 15% of an alkyd resin prepared in accordance with Example E hereinabove and 85% of a benzoguanamine-formaldehyde resin. The composition contained 0.5% p-toulene sulfonic acid as catalyst, based on the weight of the guanamine.

The viscosity of this laminating composition was adjusted to give the treated sheet a 70 to 75% resin content. Drying of the paper sheet was accomplished using a source of infrared heat to a volatile content range of from between 3 to 6%. The dry sheet had excellent resin impregnation and coating.

Masonite and low density wood waste boards were surfaced with the treated overlay paper using a pressing cycle of 150° C. and 250 p. s. i. for 15 minutes. The resultant decorative surface had excellent gloss and exhibited good solvent and chemical resistance.

*Example 5*

The same general procedure and materials were employed as in Example 4 hereinabove, except that in lieu of the benzoguanamine-formaldehyde resin, 85% of alpha-(tertiary butoxy)propioguanamine - formaldehyde resin was used. The results obtained were substantially equivalent to those obtained with benzoguanamine resin.

As in the case of surface coatings, the relative proportions of aminoplast and alkyd, as well as the composition of the alkyd itself, may vary over wide proportions in laminating compositions. Generally, however, it may be said that with respect to the use of the composition of the present invention in the laminating field, that said composition will contain from between about 5 to about 50%, and in many instances more, of alkyd, though preferably the per cent of alkyd based on resin solids is from between about 15 and about 30%.

That the compositions of the present invention have utility in the field of molding compositions is evidenced by the following example, wherein all parts and percentages are by weight. This example is given primarily for the purpose of illustration and no details therein should be construed as limitations on the present invention, except as they appear in the appended claims.

*Example 6*

161 parts of an alkyd resin prepared as in Example E hereinabove and 483 parts of a benzoguanamine-formaldehyde resin having a low degree of condensation and of the type suitable for use as a molding intermediate were dissolved in a solvent composition consisting of 365 parts of ethylene glycol monomethyl ether and 65 parts of ethyl alcohol by stirring this mixture together at 40° C. To this solution was added 346 parts of sulfite cellulose having a high alpha-cellulose content in cut fibrous form. The resulting composition was then placed in a heavy-duty twin blade mixer and mixed for 30 minutes at 40° C. The mixer product was then spread on trays and dried at 70° C. for about 4 hours.

The dried product was then placed in a ball mill grinder along with 0.5% of p-toluene sulfonic acid as a catalyst for the methylolated benzoguanamine and 0.5% zinc stearate. This mixture was ball-mill ground for some 96 hours.

Thereafter, 50 parts of this mixture was charged to a suitable molding device and molded between rigid steel plates maintained at 145° C. with an applied pressure on the mold of 850 lbs. per square inch. This molding operation produced a disc having a thickness of 31 mils, which was translucent, flexible, uniform in appearance, and practically free from coloration.

*Example 7*

The procedure employed in Example 6 was substantially followed herein, except that the alkyd resin component of the molding composition was a comparable phthalic anhydride alkyd resin. This composition required a much longer ball-mill grinding period and the molded disc manifested a stiffer flow, as evidenced by a thickness of 49 mils. In addition, the disc was practically opaque, and contained undesirable colorations.

When the compositions of the present invention are employed as molding compositions, they usually contain from between about 5 and about 50%, and sometimes more, of alkyd resin, based on the weight of resin solids and, for most applications, amounts of from between about 10 and about 30% alkyd, based on the aminoplast solids in the composition, are preferred.

In addition to the above illustrated utility, it has been determined that when the alkyd resin of the present composition is primarily the reaction product of a dibasic acid and a polyhydric alcohol substantially free of oil modification, that such a reaction product, sometimes hereinafter called a polyester material, is highly desirable for use as plasticizer for aminoplast resins and, in particular, for triazine resins, such as melamine-formaldehyde reaction products and guanamine-formaldehyde reaction products. The dibasic acid employed in the preparation of the polyester plasticizer for the aminoplast resin may be any of those enumerated hereinabove, and the polyhydric alcohol may also be any of those enumerated hereinabove.

When such polyester resin materials are employed as plasticizers, they preferably contain free hydroxyl groups and thus the reaction ratios between the components are normally such as to provide this in the reaction product.

When employed as plasticizers, the polyester resin is employed in amounts up to about 50% of the resin solids of the composition, depending upon desired end characteristics.

The alkyd resins employed in the compositions of this invention may be further modified by copolymerizing the oil-modified alkyd resins suited for use therein with compounds containing a polymerizable $CH_2=C<$ group, such as styrene, alpha-methyl styrene, alpha-ethyl styrene, alpha-chloro styrene, and the ring-substituted styrenes, such as the ortho, meta, and para-alkyl styrenes such as the ortho-methyl styrene, meta-methyl styrene, p-methyl styrene, meta-ethyl styrene, p-propyl styrene and the like; or the di-substituted styrenes, such as 2,4-dimethyl styrene, 2,5-diethyl styrene, and 3,4-dipropyl styrene and the like; or the ring substituted mono and dihalo styrenes such as ortho, meta or parachloro styrenes or 2,4-dichloro styrene or 2,4-dibromo styrene and the like. Additionally, one could make use of such polymerizable monomers as the alkyl acrylates and methacrylates, such as methyl methacrylate, methyl acrylate, and the like; or the nitriles such as acrylonitrile, methacrylonitrile, ethacrylonitrile, and the like. These polymerizable monomers may be used either singly or in combination with one another. When the alkyd resins used herein are modified by reaction with a compound containing a polymerizable $CH_2=C<$ group, it is generally desired that the alkyd resin be first modified with an oil or the fatty acids derived therefrom, or the oil may be interpolymerized with the monomer and then reacted with a polyhydric alcohol and a novel dicarboxylic acid of the present invention. These oils or fatty acids are preferably those which contain some measure of unsaturation in order to permit interpolymerization between the unsaturated group in the vinyl or vinylidene group with the unsaturated double bond in the fatty acid chain. This lends to greater compatibility between the homopolymer which may be present and the vinyl or vinylidene monomer modified oil alkyd resin.

Obviously, materials other than those set forth in the numerous illustrative examples hereinabove may be employed in or with the compositions of the present invention, depending upon the particular end usage to which it is to be put, so long as they do not impair the effectiveness of these compositions for their intended purposes. Thus, fillers, dyes, pigments, curing catalysts, and the like, may be readily employed in conjunction therewith.

In addition to the aminoplast materials disclosed hereinabove, aldehyde condensation products of that class of compounds known as urethanes and polyurethanes are included in the scope of the present invention. Examples of suitable urethanes include ethylene glycol diurethane;

1,2-propylene glycol diurethane; 1,3-propylene glycol diurethane; 1,4-butylene glycol diurethane; ethylene diglycol diurethane; pentanediol diurethane; 2-ethyl-2-butyl-propanediol-1,3-diurethane; thio-diglycol diurethane; diethanolamine diurethane; dimethylol benzene triurethane; trimethylol benzene triurethanes; pentaerythritol tetraurethanes; and trimethylol ethane triurethanes. The aldehyde condensation products of these and other urethanes, as well as their alkylated derivatives, may be employed singly or combination with one another and with other aminoplast materials, examples of which are disclosed hereinabove.

I claim:

1. A composition comprising a blend of an aminoplast resin and alkyd resin, said alkyd resin comprising the esterification reaction product of a polyhydric alcohol and an acid having the general formula:

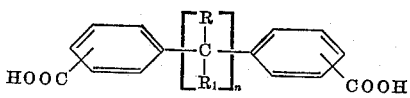

wherein R and $R_1$ are alkyl groups containing from 1 to 4 carbon atoms and $n$ is a whole number between 1 and 2, inclusive wherein said aminoplast resin is an aldehyde condensation product of a compound selected from the group consisting of an aminotriazine and a urea in which said compound has at least one —$NH_2$ group and said polyhydric alcohol is a low molecular weight aliphatic polyhydric alcohol.

2. A composition according to claim 1 in which the alkyd resin component of the composition is glyceride oil modified.

3. A composition according to claim 1 in which the acid is 4,4'-isopropylidenedibenzoic acid.

4. A composition according to claim 1 in which the acid is 4,4'-(1,1,2,2-tetramethylethylene)dibenzoic acid.

5. A composition according to claim 1 in which the acid is 4,4'-(3,3-pentylidene)dibenzoic acid.

6. A composition according to claim 1 in which the acid is 4,4'-(1,1,2,2-tetraethylethylene)dibenzoic acid.

7. A composition according to claim 1 in which the acid is 4,4'-(2,2-butylidene)dibenzoic acid.

8. A composition comprising a blend of an aminotriazine-formaldehyde reaction product and an alkyd resin, said alkyd resin comprising the esterification reaction product of a polyhydric alcohol and an acid having the general formula:

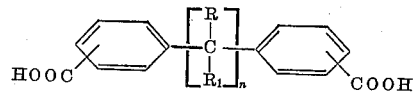

wherein R and $R_1$ are alkyl groups containing from 1 to 4 carbon atoms and $n$ is a whole number between 1 and 2, inclusive wherein said aminotriazine has at least one —$NH_2$ group and said polyhydric alcohol is a low molecular weight aliphatic polyhydric alcohol.

9. A composition according to claim 8 in which the aminotriazine-formaldehyde reaction product is a melamine-formaldehyde reaction product.

10. A composition according to claim 8 in which the aminotriazine-formaldehyde reaction product is a guanamine-formaldehyde reaction product.

11. A composition according to claim 8 in which the aminotriazine-formaldehyde reaction product is a melamine-formaldehyde reaction product and the acid is 4,4'-isopropylidenedibenzoic acid.

12. A composition according to claim 8 in which the aminotriazine-formaldehyde reaction product is a melamine-formaldehyde reaction product and the acid is 4,4'-(1,1,2,2-tetramethylethylene) dibenzoic acid.

13. A composition according to claim 8 in which the aminotriazine-formaldehyde reaction product is a melamine-formaldehyde reaction product and the acid is 4,4'-(3,3-pentylidene)dibenzoic acid.

14. A composition according to claim 8 in which the aminotriazine-formaldehyde reaction product is a melamine-formaldehyde reaction product and the acid is 4,4'-(1,1,2,2-tetraethylethylene) dibenzoic acid.

15. A composition according to claim 8 in which the aminotriazine-formaldehyde reaction product is a melamine-formaldehyde reaction product and the acid is 4,4'-(2,2-butylidene)dibenzoic acid.

References Cited in the file of this patent
UNITED STATES PATENTS 2,294,590    West _____ Sept. 1, 1942

UNITED STATES PATENT OFFICE
CERTIFICATE OF CORRECTION

Patent No. 2,851,429

September 9, 1958

John C. Petropoulos

It is hereby certified that error appears in the printed specification of the above numbered patent requiring correction and that the said Letters Patent should read as corrected below.

Column 3, line 37, for "-tethraethyl-" read -- -tetraethyl- --; column 6, line 10, for "these" read -- there --; column 9, line 54, after the syllable "sub" insert a hyphen; column 13, line 15, before "alkyd resin", first occurrence, insert the word -- an --.

Signed and sealed this 11th day of November 1958.

(SEAL)
Attest:

KARL H. AXLINE
Attesting Officer

ROBERT C. WATSON
Commissioner of Patents